(12) United States Patent
Kilian et al.

(10) Patent No.: US 8,465,350 B2
(45) Date of Patent: Jun. 18, 2013

(54) CONTROL METHOD FOR RESS FAN OPERATION IN A VEHICLE

(75) Inventors: Peter Kilian, Heidelberg (DE); Remy Fontaine, Wiesbaden (DE); Sebastain Lienkamp, Budenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 1753 days.

(21) Appl. No.: 11/770,392

(22) Filed: Jun. 28, 2007

(65) Prior Publication Data

US 2009/0001183 A1 Jan. 1, 2009

(51) Int. Cl.
*B60H 1/00278* (2006.01)
*H01M 8/04007* (2006.01)
*B60H 2001/00307* (2006.01)

(52) U.S. Cl.
USPC ................................ 454/75; 429/433; 62/133

(58) Field of Classification Search
USPC .................. 454/75; 429/83, 433, 439; 62/133
See application file for complete search history.

(56) References Cited

U.S. PATENT DOCUMENTS

| | | | | |
|---|---|---|---|---|
| 4,401,852 A * | 8/1983 | Noso et al. | ...... | 367/198 |
| 5,490,572 A * | 2/1996 | Tajiri et al. | ...... | 180/65.1 |
| 5,937,664 A * | 8/1999 | Matsuno et al. | ...... | 62/259.2 |
| 6,315,069 B1 * | 11/2001 | Suba et al. | ...... | 180/68.5 |
| 6,662,891 B2 * | 12/2003 | Misu et al. | ...... | 180/68.1 |
| 6,978,855 B2 | 12/2005 | Kubota et al. | | |
| 7,013,659 B2 * | 3/2006 | Yoshida et al. | ...... | 62/186 |
| 7,024,871 B2 | 4/2006 | Zhu et al. | | |
| 7,028,795 B2 * | 4/2006 | Tabata | ...... | 180/65.21 |
| 7,102,310 B2 * | 9/2006 | Ishishita | ...... | 318/268 |
| 7,236,090 B2 * | 6/2007 | Gumbel et al. | ...... | 340/468 |
| 7,240,752 B2 * | 7/2007 | Takahashi et al. | ...... | 180/68.1 |
| 7,348,741 B2 * | 3/2008 | Minekawa et al. | ...... | 318/268 |
| 7,484,008 B1 * | 1/2009 | Gelvin et al. | ...... | 709/249 |
| 7,654,351 B2 * | 2/2010 | Koike et al. | ...... | 180/68.5 |
| 7,686,111 B2 * | 3/2010 | Koenekamp et al. | ...... | 180/65.1 |
| 7,767,354 B2 * | 8/2010 | Saito et al. | ...... | 429/433 |
| 7,793,746 B2 * | 9/2010 | Maier | ...... | 180/68.3 |
| 7,828,091 B2 * | 11/2010 | Wedderburn et al. | ...... | 180/2.2 |
| 7,947,387 B2 * | 5/2011 | Saito et al. | ...... | 429/62 |
| 7,975,757 B2 * | 7/2011 | Nemesh et al. | ...... | 165/42 |
| 7,988,543 B2 * | 8/2011 | Major | ...... | 454/107 |
| 8,029,343 B2 * | 10/2011 | Major et al. | ...... | 454/70 |
| 2004/0069546 A1 * | 4/2004 | Lou et al. | ...... | 180/65.2 |
| 2007/0089442 A1 * | 4/2007 | Tsuchiya | ...... | 62/186 |
| 2008/0066476 A1 * | 3/2008 | Zhu et al. | ...... | 62/133 |
| 2009/0024252 A1 * | 1/2009 | Aridome et al. | ...... | 700/275 |

FOREIGN PATENT DOCUMENTS

| DE | 112007000754 T5 | 3/2009 |
|---|---|---|
| EP | 1504949 A1 | 2/2005 |
| JP | 2005343377 A | 12/2005 |

* cited by examiner

*Primary Examiner* — Steven B McAllister
*Assistant Examiner* — Frances H Kamps
(74) *Attorney, Agent, or Firm* — Fraser Clemens Martin & Miller LLC; J. Douglas Miller

(57) ABSTRACT

A method of controlling the ventilation system for an energy source in a fuel cell vehicle is disclosed, which includes an HVAC system, a fluid reserve, and a rechargeable energy storage system (RESS), capable of controlling a temperature of the RESS to militate against damage to or a shortened life of the battery, while maximizing vehicle durability, efficiency, performance, and passenger comfort.

17 Claims, 2 Drawing Sheets

CONTROL METHOD FOR RESS FAN OPERATION IN A VEHICLE

FIELD OF THE INVENTION

The present disclosure relates to a method of operation of a fuel cell system. More particularly, the invention relates to a control of a ventilation system in a rechargeable energy storage system in a vehicle.

BACKGROUND OF THE INVENTION

Various hybrid vehicles have been designed and developed in the automotive industry that operate using fuel cell technology and other rechargeable energy storage and generating systems. In a typical fuel cell vehicle, a fuel cell generates electricity through an electrochemical reaction between hydrogen and oxygen to charge batteries or to provide power for an electric motor. In certain fuel cell vehicles, the vehicle requirements allow a higher power split between a battery system and a fuel cell system. In other words, the fuel cell system is the main energy source having a greater ratio of use than the battery system. The battery system covers peak loads, for example during acceleration, smoothens the fuel cell system load profile to enhance fuel cell system durability, and provides high voltage power in situations where the fuel cell system is not capable of producing power itself such as during startup and shutdown, for example. To support the fuel cell system in these vehicles, the vehicles are equipped with a high power density battery system.

The fuel cell vehicles equipped with the high power density battery system require a ventilation system for the battery system to control a temperature and maintain a performance of the battery cells. Performance of the battery cells is required for full vehicle performance including maximum acceleration and regeneration of kinetic energy during braking. The ventilation system for the battery system is separate from a cooling device controlling a temperature of the fuel cell system, as the temperature set points of the battery system and the fuel cell system are different.

Typically, the ventilation system includes a ventilator fan and a housing, and draws air from the passenger compartment of the vehicle. The air flows through a conduit to the battery system. However, passengers are exposed to noise generated by the ventilator fan and to the air being drawn into the conduit. Moreover, the extraction of air from the passenger compartment by the ventilation system may disrupt circulation of air in the passenger compartment, making it uncomfortable for the passengers in close proximity to the opening. Further, if the mass flow of the air drawn into the ventilation system is greater than the mass flow of the air being emitted by the HVAC system, the air may be drawn back through at least one HVAC system emission outlet into the passenger compartment to equalize the pressure in the passenger compartment, or, if a check valve is installed in the HVAC system emission outlets, the passenger compartment may become under-pressurized creating an uncomfortable environment for the passengers.

U.S. Pat. No. 6,978,855 discloses a cooling system for an electricity storing device in a fuel cell vehicle. The cooling system consists of a plurality of holes formed in the floor of the passenger compartment of the vehicle and a fan. The through holes are provided as inlet ports and outlet ports for a housing of the electricity storing device. The fan is disposed adjacent the inlet ports as a means for discharging air within the housing of the electricity storing device. Air flows into the housing through the inlet ports from the passenger compartment to cool the electricity storing device and is then discharged through the outlet ports into a space under a rear seat in the passenger compartment. Although the outlet ports are disposed at angles to prevent discharged air from directly entering the inlet ports, a temperature of the air drawn into the cooling system is influenced by the discharged air, making the cooling system less efficient. Further, the plurality of holes formed in the floor of the passenger compartment expose the passengers in the passenger compartment to the noise generated by the fan and the air discharged from the housing, thereby decreasing passenger comfort and perceived vehicle quality.

It would be desirable to develop a method for controlling ventilation of a rechargeable energy storage system (RESS) in a fuel cell vehicle, which prevents damage to or a shortened life of the energy storage device, while maximizing durability, efficiency, performance, and passenger comfort.

SUMMARY OF THE INVENTION

In concordance and agreement with the present invention, a method for controlling ventilation of a rechargeable energy storage system (RESS) in a fuel cell vehicle is disclosed, which prevents damage to or a shortened life of the energy storage device, while maximizing durability, efficiency, performance, and passenger comfort.

In one embodiment, the method for controlling the ventilation of a rechargeable energy storage system (RESS) in a vehicle comprises the steps of: providing a ventilation system having an HVAC system in fluid communication with a fluid reserve, and the fluid reserve in fluid communication with the RESS; determining the maximum noise output level of at least one vehicle component; determining the ventilation requirement of the RESS; and controlling the flow rate of a fluid through a fluid transfer device for conveying the fluid from the reserve to the RESS as a function of the maximum noise output level and the ventilation requirement of the RESS.

In another embodiment, the method for controlling the ventilation of a rechargeable energy storage system (RESS) in a vehicle comprises the steps of: providing a ventilation system having an HVAC system in fluid communication with a fluid reserve, and the fluid reserve in fluid communication with the RESS; determining the maximum noise output level of at least one vehicle component; determining the ventilation requirement of the RESS; controlling the flow rate of a fluid through a fluid transfer device for conveying the fluid from the reserve to the RESS as a function of the maximum noise output level and the ventilation requirement of the RESS; and regulating the flow rate of the HVAC system according to the flow rate of the fluid through the fluid transfer device.

In another embodiment, a system for controlling the ventilation of a rechargeable energy storage system (RESS) in a vehicle comprises: a maximum noise output calculating unit in electrical communication with at least one vehicle component; and a fluid transfer device control unit in electrical communication with the maximum noise output calculating unit and the RESS.

DRAWINGS

The above, as well as other advantages of the present invention, will become readily apparent to those skilled in the art from the following detailed description of an exemplary embodiment when considered in the light of the accompanying drawings in which.

DETAILED DESCRIPTION OF THE INVENTION

The following detailed description and appended drawings describe and illustrate various exemplary embodiments of the present invention. The description and drawings serve to enable one skilled in the art to make and use the invention, and are not intended to limit the scope of the invention in any manner. It is understood that materials other than those described can be used without departing from the scope and spirit of the invention. In respect of the methods disclosed, the steps presented are exemplary in nature, and thus, are not necessary or critical.

Figure 1:
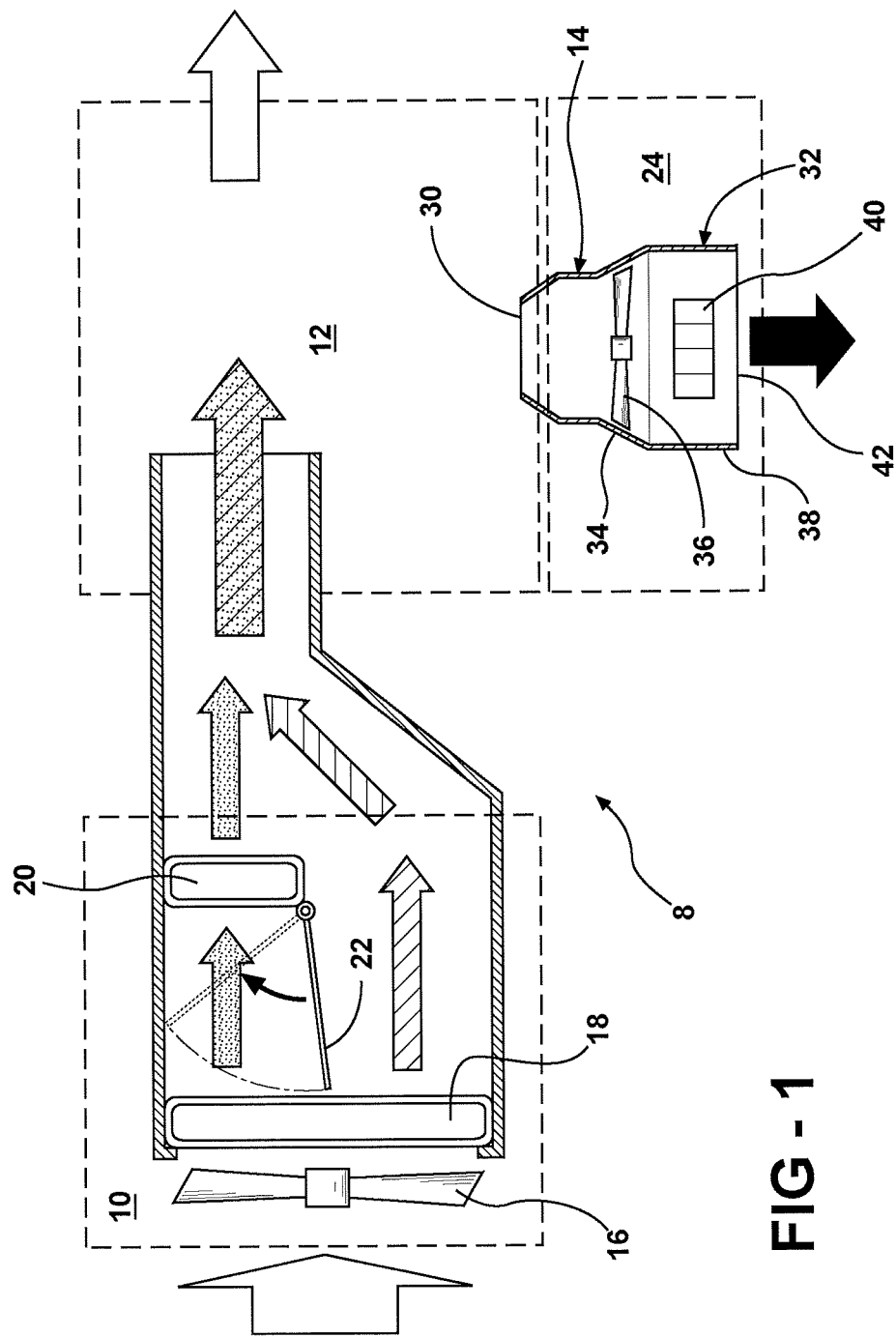
FIG. 1 is a schematic flow diagram of a ventilation system in a fuel cell vehicle according to an embodiment of the invention.

FIG. 1 illustrates a ventilation system 8 for an energy storage device 40 in a fuel cell vehicle (not shown) according to an embodiment of the invention. The ventilation system 8 includes a heating, ventilation, and air conditioning (HVAC) system 10 which provides a conditioned fluid, a reserve 12 which contains the conditioned fluid, and a rechargeable energy storage system (RESS) 24 which uses the conditioned fluid as a coolant.

The HVAC system 10 includes a fan 16, an evaporator 18, and a heater 20. The fan 16 causes the flow of a desired ratio of ambient fluid and fluid recirculated (not shown) from the reserve 12 through the evaporator 18. In the embodiment shown, the fluid is air. However, other fluids can be used as desired.

The evaporator 18 cools the fluid traveling though the evaporator 18 in a manner commonly known in the art. The temperature of the fluid is typically lowered from approximately 25 degrees Celsius to 15 degrees Celsius, although it is understood that the temperature can be changed to other values as well.

The fluid may also be heated before exiting the HVAC system 10. In these situations, a portion of the fluid exiting the evaporator 18 is directed to a heater 20 by a bypass switch 22. The bypass switch 22 may be a valve or a moveable door, for example. The bypass switch 22 causes a portion of the fluid exiting the evaporator 18 to flow directly to the reserve 12 and the remaining portion of the fluid to flow into the heater 20. The heater 20 increases the temperature of the fluid traveling through the heater 20 in a manner commonly known in the art. After exiting the heater 20, the fluid mixes with the fluid flowing directly from the evaporator 18. If any of the fluid entering the HVAC system 10 passes through the heater 20, the temperature of the mixed fluid is increased. Typically, the temperature is raised between 15 degrees Celsius and 20 degrees Celsius, although it is understood that the temperature of the mixed fluid can be raised to other temperatures as desired. The conditioned fluid is then exhausted into the reserve 12.

According to the illustrated embodiment of the invention, the reserve 12 is the passenger compartment of the fuel cell vehicle. The reserve 12 is disposed between the HVAC system 10 and the RESS 24 and is in fluid communication with the HVAC system 10 and a ventilator 14. The reserve 12 is also in fluid communication with the atmosphere.

The RESS 24 includes the ventilator 14 and a battery system 32. The ventilator 14 is disposed between the reserve 12 and the battery system 32. The ventilator 14 includes a hollow housing 34 and a fluid transfer device 36. The housing 34 is adapted to enclose the fluid transfer device 36 and includes an inlet 30 formed therein in fluid communication with the reserve 12. Any conventional material can be used to form the housing 34 such as polypropylene, for example. In the embodiment shown, the fluid transfer device 36 is an adjustable speed fan. However, it is understood that the fluid transfer device 36 can be any transfer device known in the art, such as a pump or a turbine, for example. The fluid transfer device 36 causes fluid to flow from the reserve 12 to the RESS 24.

The battery system 32 includes a housing 38 having a hollow interior and at least one energy storage device 40. The housing 38 is adapted to contain the energy storage device 40 and includes an outlet 42 formed therein. Any conventional material can be used to form the housing 38 such as polypropylene, for example. In the embodiment shown, the energy storage device 40 is a lithium battery cell. It is understood that the energy storage device 40 can be any energy storage device know in the art such as an accumulator, a super-capacitor or combinations thereof, for example. Typically, the temperature of the fluid entering the battery system 32 is lower than a temperature of the fluid exhausted from the battery system 32. The temperature of the fluid entering the battery system 32 is typically approximately 20 degrees Celsius. However, the temperature of the fluid can be any temperature, as desired. The battery system 32 is in fluid communication with the ventilator 14.

Figure 2:
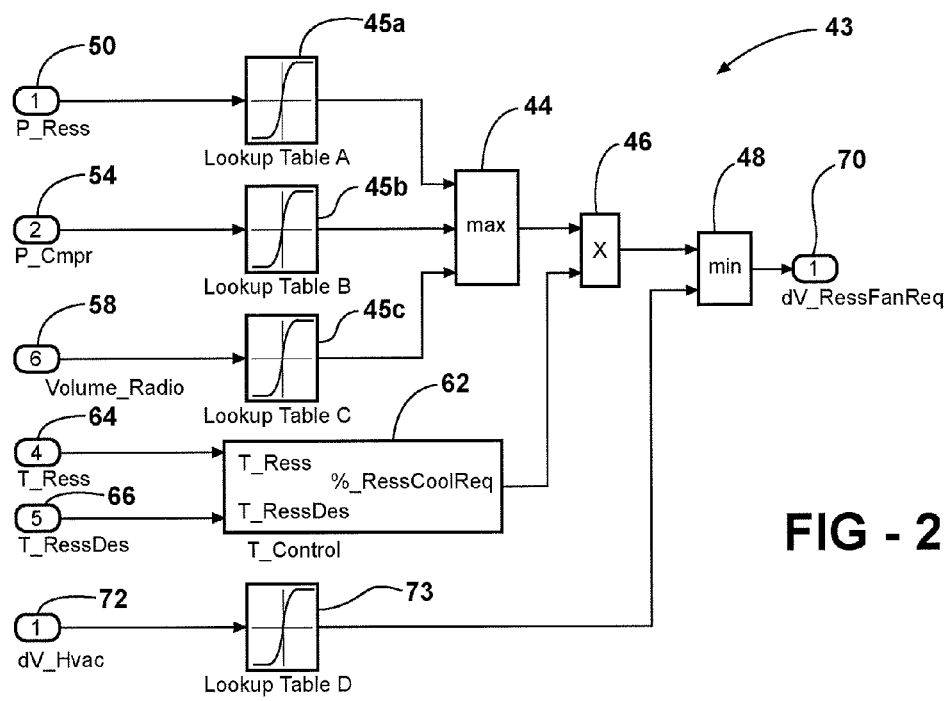
FIG. 2 is a schematic diagram of a control system for the ventilation system illustrated in FIG. 1.

In FIG. 2, a control system 43 for controlling the ventilation of the RESS 24 is shown. The control system 43 includes a maximum noise output calculating unit 44, a fluid transfer device control unit 46, and a fluid transfer device restrictor 48. The noise output calculating unit 44 is in electrical communication with the RESS 24, a fuel cell system compressor (not shown), a fuel cell vehicle radio (not shown), and the fluid transfer device control unit 46. The fluid transfer device control unit 46 is in electrical communication with the noise output calculating unit 44, the RESS 24, and the fluid transfer device restrictor 48. The fluid transfer device restrictor 48 is in electrical communication with the fluid transfer device control unit 46, the HVAC system 10, and the fluid transfer device 36.

The noise output calculating unit 44 calculates the maximum noise output level of at least one fuel cell vehicle component or vehicle state. The noise output calculating unit 44 calculates the maximum noise level by looking up and summing values from pre-formulated tables for separate fuel cell vehicle components and vehicle states. In this embodiment, the maximum noise output level is calculated based on the noise output values found in tables 45a, 45b, 45c associated with a RESS power level 50, a fuel cell system compressor power level 54, and a radio volume 58, respectively. The RESS power level 50 is associated with RESS utilization during energy storage regeneration and energy distribution to at least one vehicle system. The compressor power level 54 is associated with the demands of providing oxygen molecules to the fuel cell stack. It is understood that the maximum noise output level may be calculated from pre-formulated tables associated with vehicle components including a radio or from vehicle states, for example an HVAC flow rate, vehicle wheels, ram fluid, or a passenger compartment window position (open/closed), as desired. The maximum noise output level is then used by the fluid transfer device control unit 46 to determine a maximum allowable flow rate of the fluid transfer device 36.

The fluid transfer device control unit 46 calculates the maximum allowable flow rate based on the ventilation requirement 62 of the battery system 32, the noise output of the fluid transfer device 36 associated with the ventilation requirement 62, and the maximum noise output level calculated by the noise output calculating unit 44. The ventilation requirement 62 is derived from the temperature of the RESS 64 and a desired temperature of the RESS 66. The maximum allowable flow rate of the fluid transfer device 36 is electronically communicated to the fluid transfer restrictor 48.

In situations where the flow rate of the fluid transfer device 36 exceeds the HVAC flow rate 72, the fluid transfer device restrictor 48 limits the flow rate of the fluid transfer device 36 to that of the HVAC flow rate 72 by transmitting a signal 70 corresponding to the HVAC flow rate 72 to the fluid transfer device 36. The maximum allowable flow rate of the fluid transfer device 36 is found by looking up the corresponding value of the HVAC flow rate 72 in a lookup table 73. The limitation of the flow rate of the fluid transfer device 36 to that of the HVAC flow rate 72 militates against an under-pressurization of the reserve 12 caused by fluid being drawn from the reserve 12 by the ventilator 14 at a rate greater than the rate of fluid being exhausted into the reserve 12 by the HVAC system 10.

Figure 3:
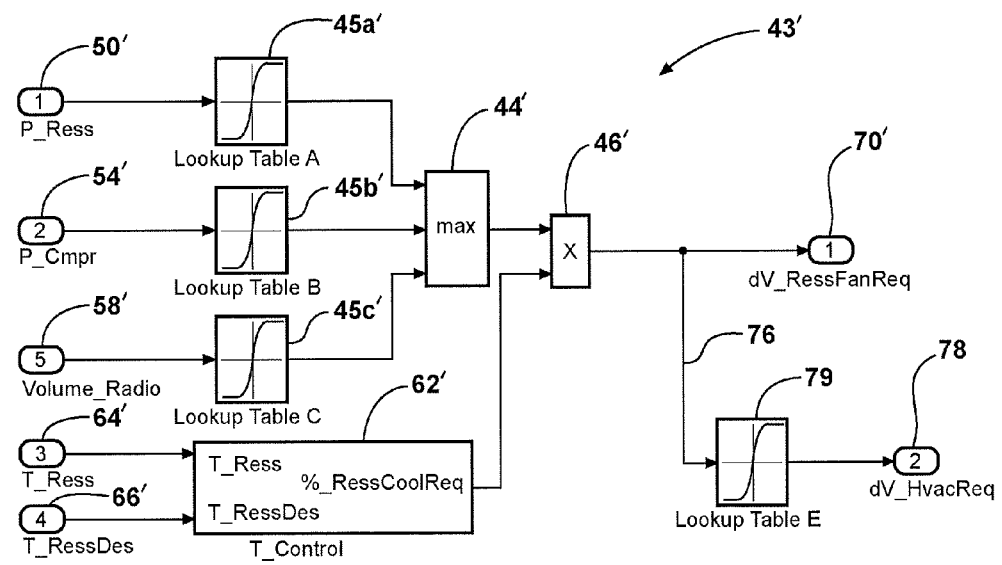
FIG. 3 is a schematic diagram of a control system for the ventilation system illustrated in FIG. 1 according to another embodiment of the invention.

FIG. 3 depicts a control system 43' for controlling the ventilation of the RESS 24 according to another embodiment of the invention. Reference numerals for similar structure in respect of the discussion of FIG. 2 above are repeated with a prime (') symbol. The control system includes a maximum noise output calculating unit 44' and a fluid transfer device control unit 46'. The noise output calculating unit 44' is in electrical communication with the RESS 24', a fuel cell system compressor (not shown), a fuel cell vehicle radio (not shown), and the fluid transfer device control unit 46'. The fluid transfer device control unit 46' is in electrical communication with the RESS 24', the fluid transfer device 36', and the HVAC system 10'.

The noise output calculating unit 44' calculates the maximum noise output level of at least one vehicle component or vehicle state. The noise output calculating unit 44' calculates the maximum noise level by looking up and summing values from pre-formulated tables for separate fuel cell vehicle components and vehicle states. In this embodiment, the maximum noise output level is calculated based on the noise output values found in tables 45a', 45b', 45c' associated with a RESS power level 50', a fuel cell system compressor power level 54', and a radio volume 58', respectively. The RESS power level 50' is associated with RESS utilization during energy storage regeneration and energy distribution to at least one vehicle system. The compressor power level 54' is associated with the demands of providing oxygen molecules to the fuel cell stack. It is understood that the maximum noise output level may be calculated from pre-formulated tables associated with vehicle components including a radio or from vehicle states, for example an HVAC flow rate, vehicle wheels, ram fluid, or a passenger compartment window position (open/closed), as desired. The maximum noise output level is then used by the fluid transfer device control unit 46' to determine the maximum allowable flow rate of the fluid transfer device 36'.

The fluid transfer device control unit 46' calculates the maximum allowable flow rate based on the ventilation requirement 62' of the battery system 32', the noise output of the fluid transfer device 36' associated with the ventilation requirement 62', and the maximum noise output level calculated by the noise output calculating unit 44'. The ventilation requirement 62' is derived from the temperature of the RESS 64' and a desired temperature of the RESS 66'. The maximum allowable flow rate of the fluid transfer device 36' is electronically communicated to the fluid transfer device 36' and the HVAC system 10'.

Instead of utilizing a fluid transfer device restrictor 48 as shown in FIG. 2 to militate against under-pressurization of the reserve 12, the control system 43' controls the required HVAC flow rate 78 which meets or exceeds the allowable flow rate of the fluid transfer device 36'. The required HVAC flow rate 78 is found from a lookup table 79 based on the allowable flow rate of the fluid transfer device 36'. The allowable flow rate of the fluid transfer device 36' is electronically communicated by the fluid transfer device control unit 46' transmitting a first signal 70' to the fluid transfer device 36' and a second signal 76 to the HVAC system 10'.

In operation, the system for controlling the ventilation of the RESS 24 can be used to conceal the noise output of the fluid transfer device or to provide acoustic feedback to the passenger that the RESS 24 is storing energy during regeneration mode or delivering energy to a vehicle system. The maximum noise output level is directly proportional to the RESS power level 50, 50' and at least one vehicle component or vehicle state. Typically, the noise output of the fluid transfer device 36, is concealed by the noise output of at least one vehicle component or vehicle state. However, during demanding vehicle performance where the RESS 24 utilization and the battery system 32 ventilation requirements are above normal operating levels, the maximum noise output level increases in proportion to the RESS power level 50, 50'. As a result, the noise output of the fluid transfer device 36 may exceed the noise output of the other vehicle components or vehicles states and therefore provide acoustic feedback to the passenger.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for controlling the ventilation of a rechargeable energy storage system (RESS) in a vehicle, the method comprising the steps of:
   (a) providing a ventilation system having an HVAC system in fluid communication with a fluid reserve, wherein the fluid reserve is disposed between the HVAC system and the RESS and is in fluid communication with the HVAC system and a ventilator located at one end of the RESS, and the ventilator of the RESS is in fluid communication with a battery system having an outlet at an opposing end of the RESS;
   (b) determining a maximum noise output level of at least one vehicle component;
   (c) determining a ventilation requirement of the RESS;
   (d) controlling a flow rate of a fluid through a fluid transfer device disposed within the ventilator of the RESS for conveying the fluid from the reserve to the RESS as a function of the maximum noise output level and the ventilation requirement of the RESS;
   (e) determining a flow rate of the HVAC system and the flow rate of the fluid through the fluid transfer device;
   (f) restricting the flow rate of the fluid through the fluid transfer device such that it is less than or equal flow to the flow rate of the HVAC system; and
   (g) exhausting the fluid from the battery system when the fluid flows from the fluid reserve to the RESS.

2. The method according to claim 1, wherein the fluid transfer device is a fan.

3. The method according to claim 1, wherein the battery system includes an energy storage device including at least one of a battery, an accumulator, and a super-capacitor.

4. The method according to claim 1, wherein step (b) includes determining the maximum noise output level by totaling noise output values from the at least one vehicle component derived from a lookup table.

5. The method according to claim 4, wherein the maximum noise output level is derived from a power level of the RESS, a power level of a fuel cell system compressor, and a volume of a radio in the vehicle.

6. The method according to claim 1, wherein step (c) includes calculating the ventilation requirement using a temperature of the RESS and a desired temperature of the RESS.

7. The method according to claim 1, wherein a maximum flow rate of the fluid through the fluid transfer device is retrieved from a lookup table.

8. A method for controlling the ventilation of a rechargeable energy storage system (RESS) in a vehicle, the method comprising the steps of:
 (a) providing a ventilation system having an HVAC system in fluid communication with a fluid reserve, wherein the fluid reserve is disposed between the HVAC system and the RESS and is in fluid communication with the HVAC system and a ventilator located at one end of the RESS, and the ventilator of the RESS is in fluid communication with a battery system having an outlet at an opposing end of the RESS;
 (b) determining a maximum noise output level of at least one vehicle component;
 (c) determining a ventilation requirement of the RESS;
 (d) controlling a flow rate of a fluid through a fluid transfer device disposed within the ventilator of the RESS for conveying the fluid from the reserve to the RESS as a function of the maximum noise output level and the ventilation requirement of the RESS;
 (e) determining a flow rate of the HVAC system and the flow rate of the fluid through the fluid transfer device;
 (f) regulating the flow rate of the HVAC system to the flow rate of the fluid through the fluid transfer device such that it is less than or equal to the flow rate of the HVAC system; and
 (g) exhausting the fluid from the battery system when the fluid flows from the fluid reserve to the RESS.

9. The method according to claim 8, wherein the fluid transfer device is a fan.

10. The method according to claim 8, wherein the battery system includes an energy storage device including at least one of a battery, an accumulator, and a super-capacitor.

11. The method according to claim 8, wherein step (b) includes determining the maximum noise output level by totaling noise output values from the at least one vehicle component derived from a lookup table.

12. The method according to claim 11, wherein the maximum noise output level is derived from a power level of the RESS, a power level of a fuel cell system compressor, and a volume of a radio in the vehicle.

13. The method according to claim 8, wherein step (c) includes calculating the ventilation requirement using a temperature of the RESS and a desired temperature of the RESS.

14. The method according to claim 8, wherein a maximum flow rate of the fluid through the fluid transfer device is retrieved from a lookup table.

15. The method according to claim 8, wherein step (d) includes transmitting a signal to the HVAC system.

16. A system for controlling the ventilation of a rechargeable energy storage system (RESS) in a vehicle, the system comprising:
 an RESS including a ventilator having an inlet at one end and a battery system having an outlet at an opposing end;
 a maximum noise output calculating unit in electrical communication with at least one vehicle component; and
 a fluid transfer device control unit for controlling a fluid transfer device, the fluid transfer device control unit in electrical communication with the maximum noise output calculating unit and the RESS, wherein the fluid transfer device control unit is configured to restrict a flow rate of a fluid through the fluid transfer device such that it is less than or equal to a flow rate of the HVAC system and exhaust the fluid from the battery system when the fluid flows from the inlet of the ventilator of the RESS to the outlet of the battery system of the RESS.

17. The system according to claim 16, further comprising a fluid transfer device restrictor in electrical communication with the fluid transfer device control unit.

* * * * *